US012720362B2

(12) United States Patent
Kadan Veedu et al.

(10) Patent No.: US 12,720,362 B2
(45) Date of Patent: Aug. 25, 2026

(54) ENABLING REDCAP WIRELESS DEVICES WITH REDUCED MAXIMUM DATA RATE

(71) Applicant: Telefonaktiebolaget LM Ericsson (publ), Stockholm (SE)

(72) Inventors: Sandeep Narayanan Kadan Veedu, Järfälla (SE); Yi-Pin Eric Wang, Fremont, CA (US); Johan Bergman, Stockholm (SE); Anders Wallén, Ystad (SE); Tuomas Tirronen, Helsinki (FI); Andreas Höglund, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 374 days.

(21) Appl. No.: 18/681,154

(22) PCT Filed: Aug. 17, 2022

(86) PCT No.: PCT/SE2022/050754
§ 371 (c)(1),
(2) Date: Feb. 5, 2024

(87) PCT Pub. No.: WO2023/022646
PCT Pub. Date: Feb. 23, 2023

(65) Prior Publication Data

US 2024/0284247 A1 Aug. 22, 2024

Related U.S. Application Data

(60) Provisional application No. 63/234,082, filed on Aug. 17, 2021.

(51) Int. Cl.
*H04W 28/02* (2009.01)
*H04W 8/24* (2009.01)

(52) U.S. Cl.
CPC ......... *H04W 28/0268* (2013.01); *H04W 8/24* (2013.01)

(58) Field of Classification Search
CPC . H04W 28/0268; H04W 28/22; H04W 41/70; H04W 8/24; H04L 41/0853
See application file for complete search history.

(56) References Cited

U.S. PATENT DOCUMENTS

2021/0051595 A1 2/2021 Rico Alvarino et al.

OTHER PUBLICATIONS

International Search Report and Written Opinion dated Dec. 2, 2022 for International Application PCT/SE2022/050754 filed Aug. 17, 2022, consisting of 12 pages.

(Continued)

*Primary Examiner* — Gbemileke J Onamuti
(74) *Attorney, Agent, or Firm* — Weisberg I.P. Law, P.A.

(57) ABSTRACT

A method, system and apparatus are disclosed. A method implemented in a wireless device configured to communicate with a network node is provided. A first indication is received from the network node indicating a first restriction, where the first restriction is related to a maximum data rate computation for at least one carrier and is different from a legacy restriction. A second indication is transmitted to the network node indicating a plurality of capability parameters, where the plurality of capability parameters violates the legacy restriction and is in accordance with the first restriction. The network node is communicated with on the at least one carrier according to a maximum data rate determination associated with the indicated plurality of capability parameters.

20 Claims, 8 Drawing Sheets

(56) References Cited

OTHER PUBLICATIONS

3GPP TR 38.875 V17.0.0; 3rd Generation Partnership Project; Technical Specification Group Radio Access Network; Study on support of reduced capability NR devices (Release 17), Mar. 2021, consisting of 135 pages.
3GPP TSG RAN Meeting #92e RP-211574, Revision of RP-210918, Title: Revised WID on support of reduced capability NR devices, Agenda Item: 9.7.1.7, Source: Ericsson, Document for: Approval, Date and Location: Jun. 14-18, 2021, Electronic Meeting, consisting of 6 pages.
3GPP TSG-RAN WG1 Meeting #106-e R1-2106566, Title: Other UE complexity reduction aspects for RedCap, Agenda Item: 8.6.1.4, Source: Ericsson, Document for: Discussion, Decision; Date and Location: Aug. 16-27, 2021, e-Meeting, consisting of 5 pages.
3GPP TSG RAN WG1 #106-e R1-2107385, Title: Discussion on scaling factor for RedCap, Agenda Item: 8.6.3, Source: Spreadtrum Communications, Apple, CEPRI, Document for: Discussion and decision, Date and Location: Aug. 16-27, 2021, e-Meeting, consisting of 8 pages.
3GPP TSG RAN Meeting #91e, Tdoc RP-210654, Title: TR38.875 V2.0.0: Study on support of reduced capability NR devices, Agenda Item: 9.6.4, Source: Rapporteur (Ericsson), Document for: Approval, Date and Location: Mar. 16-26, 2021, Electronic Meeting, consisting of 136 pages.
3GPP TS 38.306 V16.5.0; 3rd Generation Partnership Project; Technical Specification Group Radio Access Network; NR; User Equipment (UE) radio access capabilities (Release 16); Jun. 2021; consisting of 153 pages.

ENABLING REDCAP WIRELESS DEVICES WITH REDUCED MAXIMUM DATA RATE

CROSS-REFERENCE TO RELATED APPLICATIONS

This application is a Submission Under 35 U.S.C. § 371 for U.S. National Stage Patent Application of International Application No.: PCT/SE2022/050754, filed Aug. 17, 2022 entitled "ENABLING REDCAP WIRELESS DEVICES WITH REDUCED MAXIMUM DATA RATE," which claims priority to U.S. Provisional Application No. 63/234,082, filed Aug. 17, 2021, entitled "METHODS FOR ENABLING REDCAP UES WITH REDUCED MAXIMUM DATA RATE," the entireties of both of which are incorporated herein by reference.

TECHNICAL FIELD

The present disclosure relates to wireless communications, and in particular, to arrangements related to maximum data rate determination.

BACKGROUND

The next paradigm shift in processing and manufacturing may be considered Industry 4.0 in which factories are automated and made much more flexible and dynamic with the help of wireless connectivity. This includes real-time control of robots and machines using time-critical machine-type communication (cMTC) and improved observability, control, and error detection with the help of large numbers of more simple actuators and sensors (massive machine-type communication or mMTC). For cMTC support, URLLC (ultra-reliable low-latency communication) was introduced in 3$^{rd}$ Generation Partnership Project (3GPP) Release 15 for both LTE (Long-Term Evolution) and NR (New Radio, also called 3GPP 5$^{th}$ Generation or 5G), and NR URLLC is further enhanced in 3GPP Release 16 within the enhanced URLLC (eURLLC) and Industrial Internet-of-Things (IoT) work items. For mMTC and low power wide area (LPWA) support, 3GPP introduced both Narrowband Internet-of-Things (NB-IoT) and LTE for Machine-Type Communications (LTE-MTC, or LTE-M) in Release 13. These technologies have been further enhanced through all releases up until and including the ongoing 3GPP Release 17 work.

NR was introduced in 3GPP Release 15 and focused mainly on enhanced mobile broadband (eMBB) and cMTC. However, there are still several other use cases whose requirements are higher than those of LPWA networks (i.e., LTE-M/NB-IoT) but lower than those of URLLC and eMBB. In order to efficiently support such use cases which are in-between eMBB, URLLC, and mMTC, 3GPP has studied reduced capability NR devices (so called "RedCap") in Release (Rel-)17. The RedCap study item was completed in March 2021. A corresponding RedCap work item was started in December 2020 and is expected to be finalized in September 2022.

The RedCap wireless devices (WDs, also called user equipments or UEs) are required to have lower cost, lower complexity, a longer battery life, and potentially a smaller form factor than legacy NR WDs. Therefore, several different complexity reduction features may be specified for RedCap WDs in 3GPP Release 17 (Rel-17). These complexity reduction features are listed in the Rel-17 work item description (WID) for RedCap. The relevant text from the WID is reproduced below:

Specify support for the following WD complexity reduction features [RAN1, RAN2, RAN4]:

a) Reduced maximum WD bandwidth:
   i) Maximum bandwidth of a frequency 1 (FR1) RedCap WD during and after initial access is 20 MHz.
   ii) Maximum bandwidth of a frequency 2 (FR2) RedCap WD during and after initial access is 100 MHz.
b) Reduced minimum number of receiver/reception (Rx) branches:
   i) For frequency bands where a legacy NR WD is required to be equipped with a minimum of 2 Rx antenna ports, the minimum number of Rx branches supported by specification for a RedCap WD is 1. The specification also supports 2 Rx branches for a Redcap WD in these bands.
   ii) For frequency bands where a legacy NR WD (other than 2-Rx vehicular WD) is required to be equipped with a minimum of 4 Rx antenna ports, the minimum number of Rx branches supported by specification for a RedCap WD is 1. The specification also supports 2 Rx branches for a RedCap WD in these bands.
   iii) A means may be specified by which the gNB can know the number of Rx branches of the WD.
c) Maximum number of downlink (DL) multiple-input multiple-output (MIMO) layers:
   i) For a RedCap WD with 1 Rx branch, 1 DL MIMO layer is supported.
   ii) For a RedCap WD with 2 Rx branches, 2 DL MIMO layers are supported.
d) Relaxed maximum modulation order:
   i) Support of 256 quadrature amplitude modulation (256QAM) in DL is optional (instead of mandatory) for an FR1 RedCap WD.
   ii) No other relaxations of maximum modulation order are specified for a RedCap WD.
e) Duplex operation:
   i) half-duplex frequency division duplexing (HD-FDD) type A with the minimum specification impact (Note that full-duplex FDD (FD-FDD) and time division duplexing (TDD) are also supported.)

Maximum Data Rate Calculation

The maximum data rate supported by an NR WD can be computed using the expression in Section 4.1.2 of 3GPP Technical Specification (TS) 38.306 (relevant text is reproduced below):

Supported Max Data Rate for Downlink/Uplink (DL/UL)

For NR, the approximate data rate for a given number of aggregated carriers in a band or band combination is computed as follows:

$$\text{data rate(in } Mbps) = 10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot \left(1 - OH^{(j)}\right) \right)$$

wherein:

J is the number of aggregated component carriers in a band or band combination;

$R_{max}$=948/1024;

For the j-th CC, $$v_{Layers}^{(j)}$$

is the maximum number of supported layers given by higher layer parameter maxNumberMIMO-LayersPDSCH for downlink and maximum of higher layer parameters maxNumberMIMO-LayersCB-PUSCH and maxNumberMIMO-LayersNonCB-PUSCH for uplink;

$$Q_m^{(j)}$$

is the maximum supported modulation order given by higher layer parameter supportedModulationOrderDL for downlink and higher layer parameter supportedModulationOrderUL for uplink; and $f^{(j)}$ is the scaling factor given by higher layer parameter scalingFactor and can take the values 1, 0.8, 0.75, and 0.4.

[ . . . ]

The approximate maximum data rate can be computed as the maximum of the approximate data rates computed using the above formula for each of the supported band or band combinations.

From the expression copied above, it can be seen that the NR WD can indicate different maximum data rate capabilities using the scaling factor, given by the higher layer parameter scalingFactor, and the maximum supported modulation order, given by the higher layer parameters supportedModulationOrderDL and supportedModulationOrderUL for DL and UL, respectively. The definitions of these parameters from TS 38.306 are reproduced below.

| scaling Factor | FS | No | N/A | N/A |
|---|---|---|---|---|
| Indicates the scaling factor to be applied to the band in the max data rate calculation as defined in 4.1.2. Value fOp4 indicates the scaling factor 0.4, fop75 indicates 0.75, and so on. If absent, the scaling factor 1 is applied to the band in the max data rate calculation. | | | | |
| supportedModulationOrderDL | FSPC | No | N/A | N/A |
| Indicates the maximum supported modulation order to be applied for downlink in the carrier in the max data rate calculation as defined in 4.1.2. If included, the network may use a modulation order on this serving cell which is higher than the value indicated in this field as long as WD supports the modulation of higher value for downlink. If not included:<br>for FR1, the network uses the modulation order signalled in pdsch-256QAM-FRI.<br>for FR2, the network uses the modulation order signalled per band i.e. pdsch-256QAM-FR2 if signalled. If not signalled in a given band, the network shall use the modulation order 64QAM.<br>In all the cases, it shall be ensured that the data rate does not exceed the max data rate (DataRate) and max data rate per CC (DataRateCC) according to TS 38.214. | | | | |
| supportedModulationOrderUL | FSPC | No | N/A | N/A |
| Indicates the maximum supported modulation order to be applied for uplink in the carrier in the max data rate calculation as defined in 4.1.2. If included, the network may use a modulation order on this serving cell which is higher than the value indicated in this field as long as WD supports the modulation of higher value for uplink. If not included,<br>for FR1 and FR2, the network uses the modulation order signalled per band i.e. pusch-256QAM if signalled. If not signalled in a given band, the network shall use the modulation order 64QAM.<br>In all the cases, it shall be ensured that the data rate does not exceed the max data rate (DataRate) and max data rate per CC (DataRateCC) according to TS 38.214. | | | | |

The scaling factor can take the values 1, 0.8, 0.75, and 0.4, and the maximum supported modulation order can take values 1, 2, 4, 6, and 8, corresponding pi/2-BPSK/BPSK (Binary Phase Shift Keying), QPSK (quadrature phase-shift keying), 16QAM, 64QAM, and 256QAM, respectively. There is also flexibility to report the values of the scaling factor and the maximum supported modulation order separately for UL and DL. It is worth highlighting that the maximum supported modulation order concerns the modulation order assumed in the maximum data rate calculations. The network may still use a modulation order higher than the value given by this field while scheduling the WD (see the definitions of the parameters supportedModulationOrderDL and supportedModulationOrderUL reproduced above).

SUMMARY

Some embodiments advantageously provide methods, systems, and apparatuses for maximum data rate determination.

In one embodiment, a network node is configured to send information about a first legacy restriction and a second further restriction, the first legacy restriction and the second further restriction being related to a maximum data rate computation for at least one carrier; and support and/or communicate on the at least one carrier according to a maximum data rate determination, the first legacy restriction and/or the second further restriction being modified and/or applied to the maximum data rate determination based at least in part on a type of the WD.

In another embodiment, a wireless device is configured to determine a first legacy restriction and a second further restriction, the first legacy restriction and the second further restriction being related to a maximum data rate computation for at least one carrier supported by the network node; determine whether to modify and/or apply the first legacy restriction and/or the second further restriction to the maximum data rate determination based at least in part on a type of the WD; and support and/or communicate on the at least one carrier based at least in part on the maximum data rate determination.

According to another aspect of the present disclosure, a network node configured to communicate with a wireless device is provided. The network node includes processing circuitry configured to cause transmission of a first indication to the wireless device indicating a first restriction, where the first restriction is related to a maximum data rate computation for at least one carrier and is different from a legacy restriction. The processing circuitry is further configured to receive a second indication from the wireless device indicating a plurality of capability parameters that are based on the first restriction, where the plurality of capability parameters violate the legacy restriction and are in accordance with the first restriction. The processing circuitry is further configured to communicate with the wireless device on the at least one carrier in accordance with a maximum data rate indicated by the indicated plurality of capability parameters.

According to another aspect of the present disclosure, a method implemented in a network node configured to communicate with a wireless device is provided. A first indication is transmitted to the wireless device indicating a first restriction, where the first restriction is related to a maximum data rate computation for at least one carrier and is different from a legacy restriction. A second indication is received from the wireless device indicating a plurality of capability parameters that are based on the first restriction, where the plurality of capability parameters violate the legacy restriction and are in accordance with the first restriction. The wireless device is communicated with on the at least one carrier in accordance with a maximum data rate indicated by the indicated plurality of capability parameters.

According to another aspect of the present disclosure, a wireless device configured to communicate with a network node is provided. The wireless device includes processing circuitry configured to receive a first indication from the network node indicating a first restriction, where the first restriction is related to a maximum data rate computation for at least one carrier and is different from a legacy restriction. The processing circuitry is further configured to cause transmission of a second indication to the network node indicating a plurality of capability parameters, where the plurality of capability parameters violate the legacy restriction and are in accordance with the first restriction. The processing circuitry is further configured to communicate with the network node on the at least one carrier according to a maximum data rate determination associated with the indicated plurality of capability parameters.

According to another aspect of the present disclosure, a method implemented in a wireless device configured to communicate with a network node is provided. A first indication is received from the network node indicating a first restriction, where the first restriction is related to a maximum data rate computation for at least one carrier and is different from a legacy restriction. A second indication is transmitted to the network node indicating a plurality of capability parameters, where the plurality of capability parameters violates the legacy restriction and is in accordance with the first restriction. The network node is communicated with on the at least one carrier according to a maximum data rate determination associated with the indicated plurality of capability parameters.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
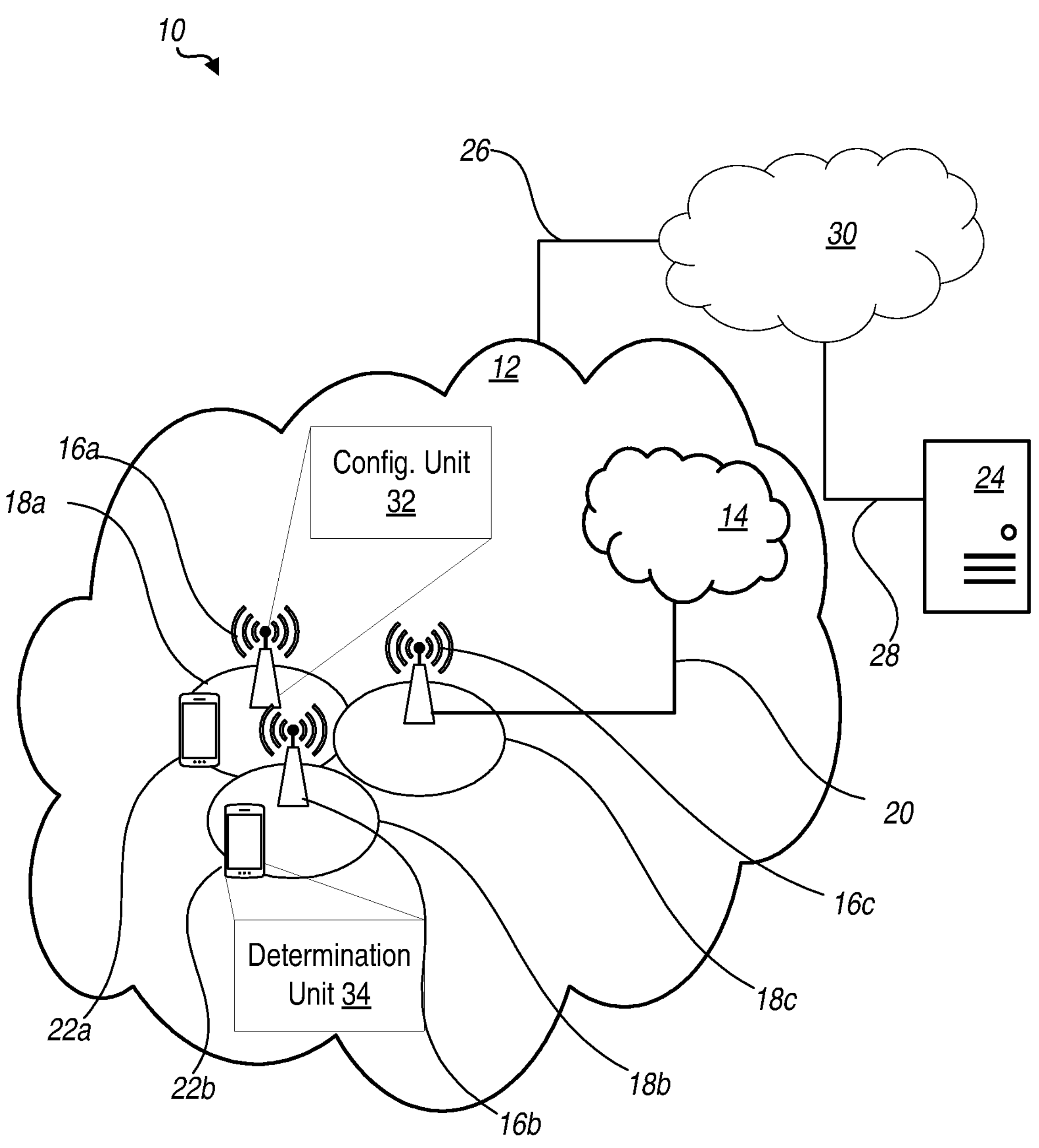
FIG. 1 is a schematic diagram of an example network architecture illustrating a communication system connected via an intermediate network to a host computer according to the principles in the present disclosure.

It is noted that the reduction in maximum data rate supported by the WD may help to reduce its memory size (OSI Layer 2 (L2) and hybrid automatic repeat request (HARQ) buffers), and consequently the cost of the WD.

With regards to the scaling factor and the maximum supported modulation order indicated by the WD in capability signaling, there is currently a restriction related to maximum data rate in 3GPP TS 38.306 (see below) that the product of the maximum number of supported MIMO layers, the scaling factor and the maximum supported modulation order is no smaller than 4. This may be referred to herein as a "legacy restriction".

For single carrier NR standalone (SA) operation, the WD shall support a data rate for the carrier that is no smaller than the data rate computed using the above formula, with J=1 CC and component $$v_{Layers}^{(j)} \cdot Q_m^{(j)} \cdot f^{(j)}$$

is no smaller than 4.

NOTE: As an example, the value 4 in the component above can correspond to $$v_{Layers}^{(j)} = 1,\ Q_m^{(j)} = 4 \text{ and } f^{(j)} = 1.$$

If the above restriction is in place, the maximum data rate supported by all RedCap WDs should at least be:

~55 Mbps in DL and ~52 Mbps in UL, with 20 MHz WD bandwidth (BW) and 30 kHz subcarrier spacing (SCS); and ~57 Mbps in DL and ~54 Mbps in UL, with 20 MHz WD BW and 15 kHz SCS.

Some RedCap use cases may only require maximum data rates substantially lower than what is stated above. For example, industrial wireless sensor network use cases require maximum data rate of only 2 Mbps or less. Therefore, there is a potential for further cost reduction and power saving for RedCap WDs if the above restriction is removed.

However, it may not be suitable to completely remove the restriction. This is because, if the restriction is removed, the maximum data rate supported by the WD can be as low as ~5 Mbps (with 20 MHz WD BW and 30 kHz SCS). This corresponds to a maximum transport block size (TBS) of ~2500 bits, which is less than the maximum TBS required for system information/paging messages. Therefore, the RedCap WDs may not be able to receive these system information/paging messages.

Some embodiments provide for arrangements including new restrictions and/or propose to remove/modify existing restrictions related to maximum data rate calculation in e.g., 3GPP TS 38.306 in order to enable RedCap WDs with reduced requirements on maximum data rate.

Some embodiments provide new restrictions and removal/modification of existing restrictions related to maximum data rate calculation in 3GPP TS 38.306. New restrictions and/or removal/modification of existing restrictions may be referred to herein as "further restrictions."

Some embodiments may advantageously reduce the memory size (OSI L2 and HARQ buffers) and consequently the cost of RedCap WDs in use cases that require low maximum data rate (e.g., industrial wireless networks). Furthermore, in some embodiments, the WD may also be able to receive system information/paging messages which can be common to both RedCap and non-RedCap WDs.

Before describing in detail example embodiments, it is noted that the embodiments reside primarily in combinations of apparatus components and processing steps related to maximum data rate determination. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Even though the descriptions herein may be explained in the context of one of a Downlink (DL) and an Uplink (UL) communication, it should be understood that the basic principles disclosed may also be applicable to the other of the one of the DL and the UL communication. In some embodiments in this disclosure, the principles may be considered applicable to a transmitter and a receiver. For DL communication, the network node is the transmitter and the receiver is the WD. For the UL communication, the transmitter is the WD and the receiver is the network node.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Generally, it may be considered that the network, e.g. a signaling radio node and/or node arrangement (e.g., network node), configures a WD, in particular with the transmission resources. A resource may in general be configured with one or more messages. Different resources may be configured with different messages, and/or with messages on different layers or layer combinations. The size of a resource may be represented in symbols and/or subcarriers and/or resource elements and/or physical resource blocks (depending on domain), and/or in number of bits it may carry, e.g. information or payload bits, or total number of bits. The set of resources, and/or the resources of the sets, may pertain to the same carrier and/or bandwidth part, and/or may be located in the same slot, or in neighboring slots.

In some embodiments, control information on one or more resources may be considered to be transmitted in a message having a specific format. A message may comprise or represent bits representing payload information and coding bits, e.g., for error coding.

Receiving (or obtaining) control information may comprise receiving one or more control information messages (e.g., an RRC monitoring parameter). It may be considered that receiving control signaling comprises demodulating and/or decoding and/or detecting, e.g. blind detection of, one or more messages, in particular a message carried by the control signaling, e.g. based on an assumed set of resources, which may be searched and/or listened for the control information. It may be assumed that both sides of the communication are aware of the configurations, and may determine the set of resources, e.g. based on the reference size.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

Transmitting in downlink may pertain to transmission from the network or network node to the terminal. The terminal may be considered the WD or UE. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device (WD) or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device (e.g., the indication of the resource allocation as discussed above). Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Configuring a radio node, in particular a terminal or user equipment or the WD, may refer to the radio node being adapted or caused or set and/or instructed to operate according to the configuration. Configuring may be done by another device, e.g., a network node (for example, a radio node of the network like a base station or gNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources, or e.g., configuration for performing certain measurements on certain subframes or radio resources. A radio node may configure itself, e.g., based on configuration data received from a network or network node. A network node may use, and/or be adapted to use, its circuitry/ies for configuring. Allocation information may be considered a form of configuration data. Configuration data may comprise and/or be represented by configuration information, and/or one or more corresponding indications and/or message/s.

A cell may be generally a communication cell, e.g., of a cellular or mobile communication network, provided by a node. A serving cell may be a cell on or via which a network node (the node providing or associated to the cell, e.g., base station or gNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or WD and/or network follow the LTE or NR-standard. One or more carriers (e.g., uplink and/or downlink carrier/s and/or a carrier for both uplink and downlink) may be associated to a cell.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station or eNodeB, may be adapted to provide and/or define and/or control one or more cells, e.g., a PCell and/or a LA cell.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

In some embodiments, a "set" as used herein may be a set of 1 or more elements in the set.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide arrangements related to maximum data rate determination. Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a configuration unit 32 which is configured to send information about a first legacy restriction and a second further restriction, the first legacy restriction and the second further restriction being related to a maximum data rate computation for at least one carrier; and support and/or communicate on the at least one carrier according to a maximum data rate determination, the first legacy restriction and/or the second further restriction being modified and/or applied to the maximum data rate determination based at least in part on a type of the WD.

A wireless device 22 is configured to include a determination unit 34 which is configured to determine a first legacy restriction and a second further restriction, the first legacy restriction and the second further restriction being related to a maximum data rate computation for at least one carrier supported by the network node; determine whether to modify and/or apply the first legacy restriction and/or the second further restriction to the maximum data rate determination based at least in part on a type of the WD; and support and/or communicate on the at least one carrier based at least in part on the maximum data rate determination.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to monitor the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to perform the methods described with respect to FIG. 7 and the other figures.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a determination unit 34 configured perform the methods described with reference to FIG. 8 and the other figures.

Figure 2:
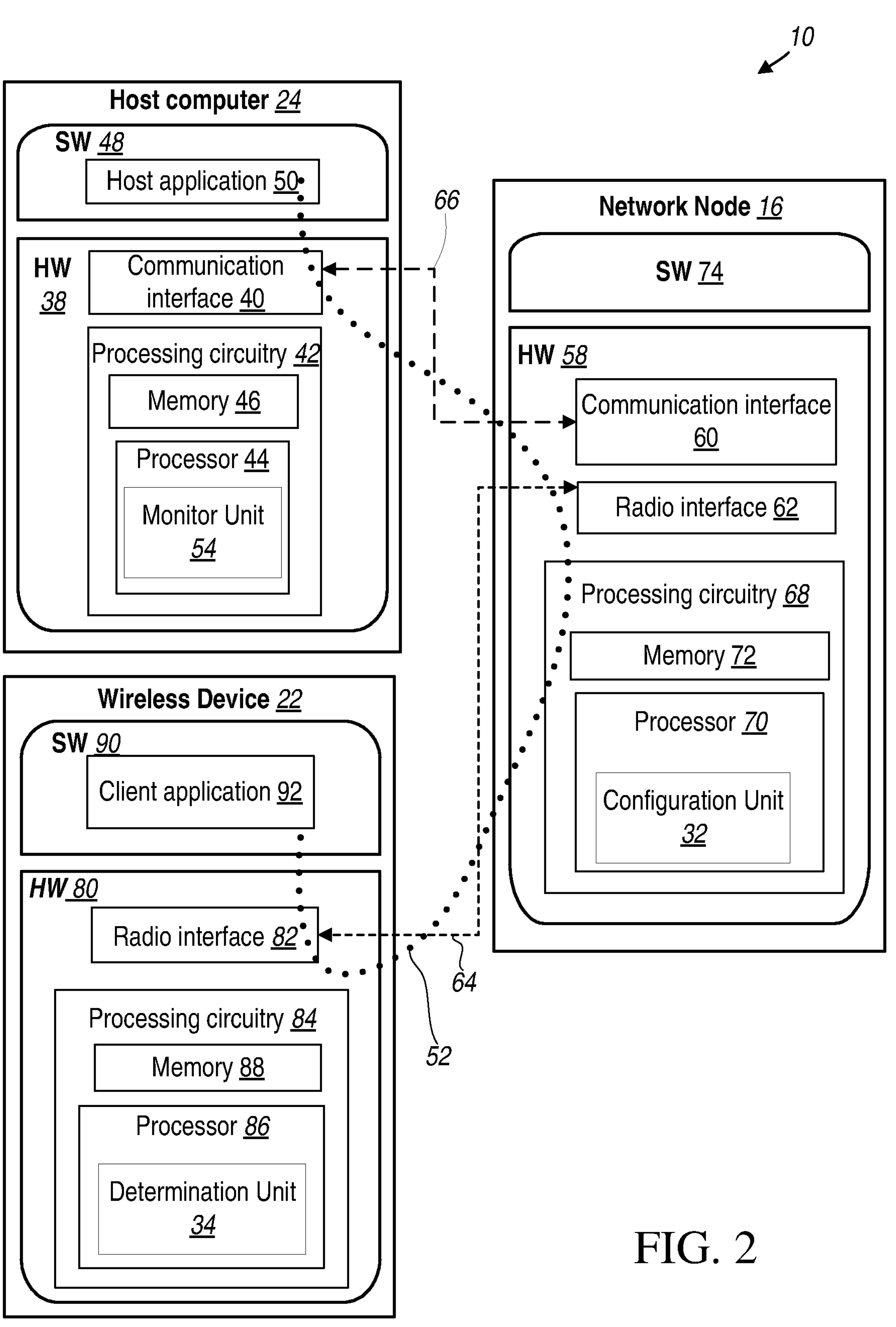
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as configuration unit 32, and determination unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 3, 4:
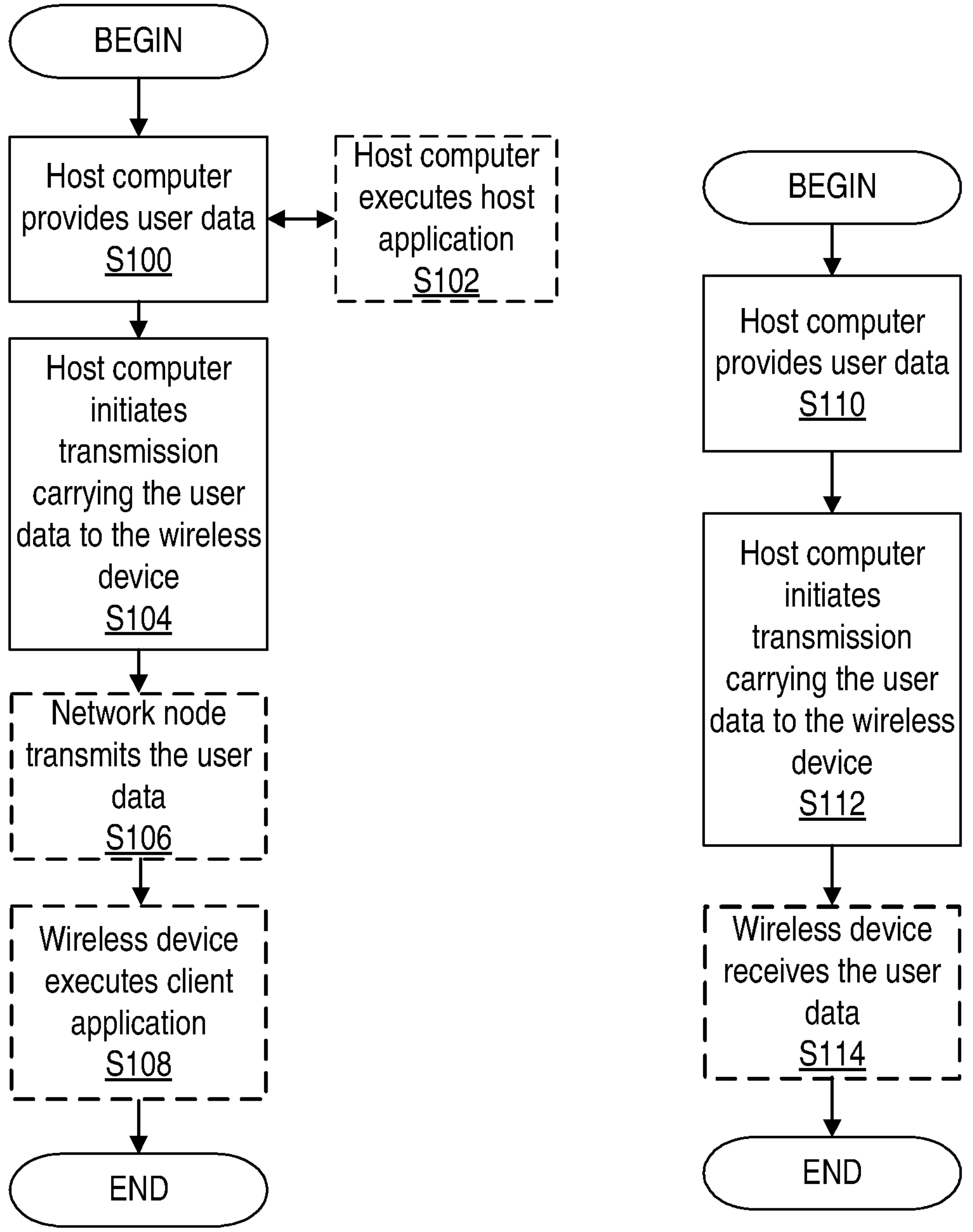
FIG. 3 is a flowchart illustrating example methods implemented in a communication system including a host computer, a network node and a wireless device for executing a client application at a wireless device according to some embodiments of the present disclosure.
FIG. 4 is a flowchart illustrating example methods implemented in a communication system including a host computer, a network node and a wireless device for receiving user data at a wireless device according to some embodiments of the present disclosure.

FIG. 3 is a flowchart illustrating an example method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 5, 6:
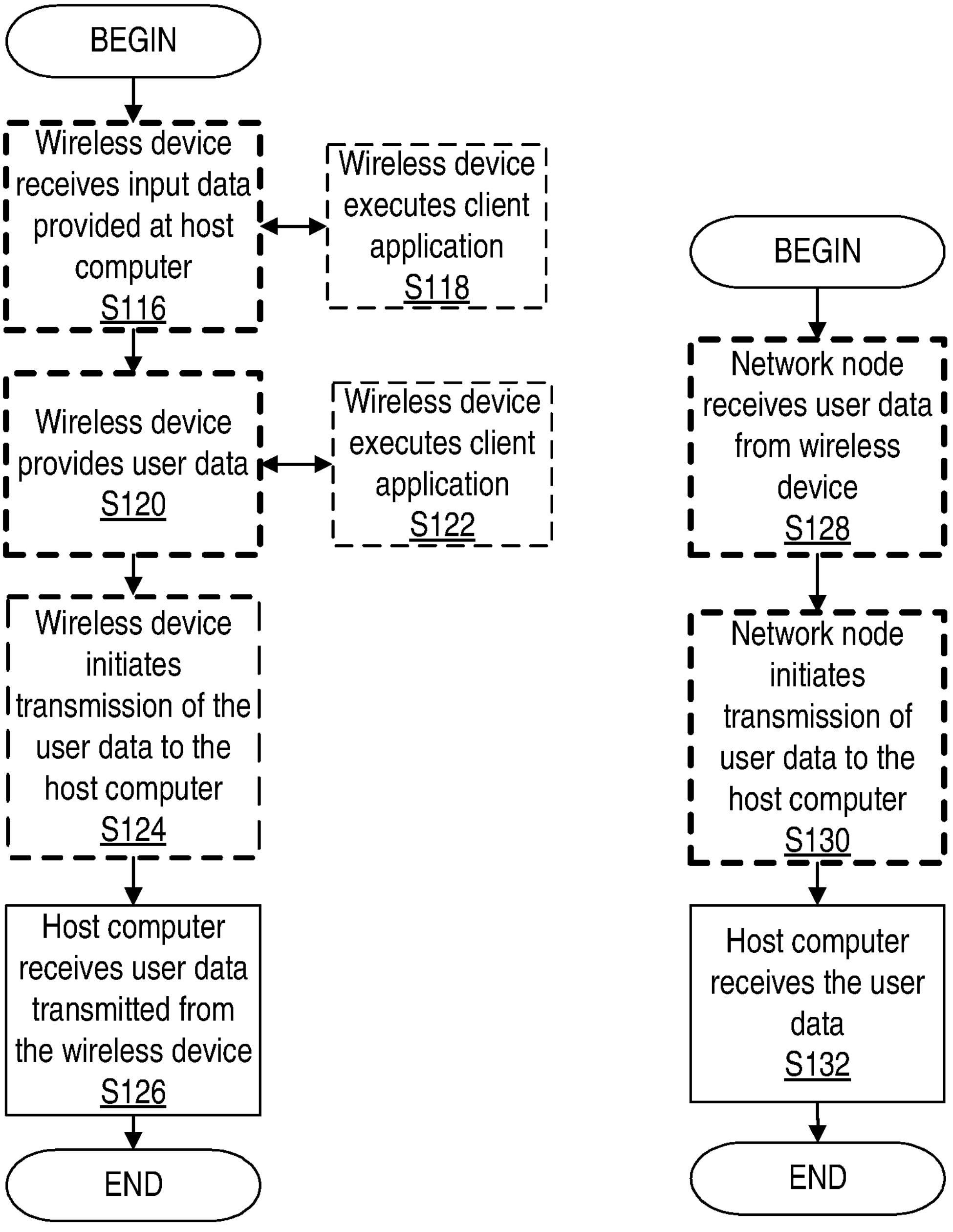
FIG. 5 is a flowchart illustrating example methods implemented in a communication system including a host computer, a network node and a wireless device for receiving user data from the wireless device at a host computer according to some embodiments of the present disclosure.
FIG. 6 is a flowchart illustrating example methods implemented in a communication system including a host computer, a network node and a wireless device for receiving user data at a host computer according to some embodiments of the present disclosure.

FIG. 5 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
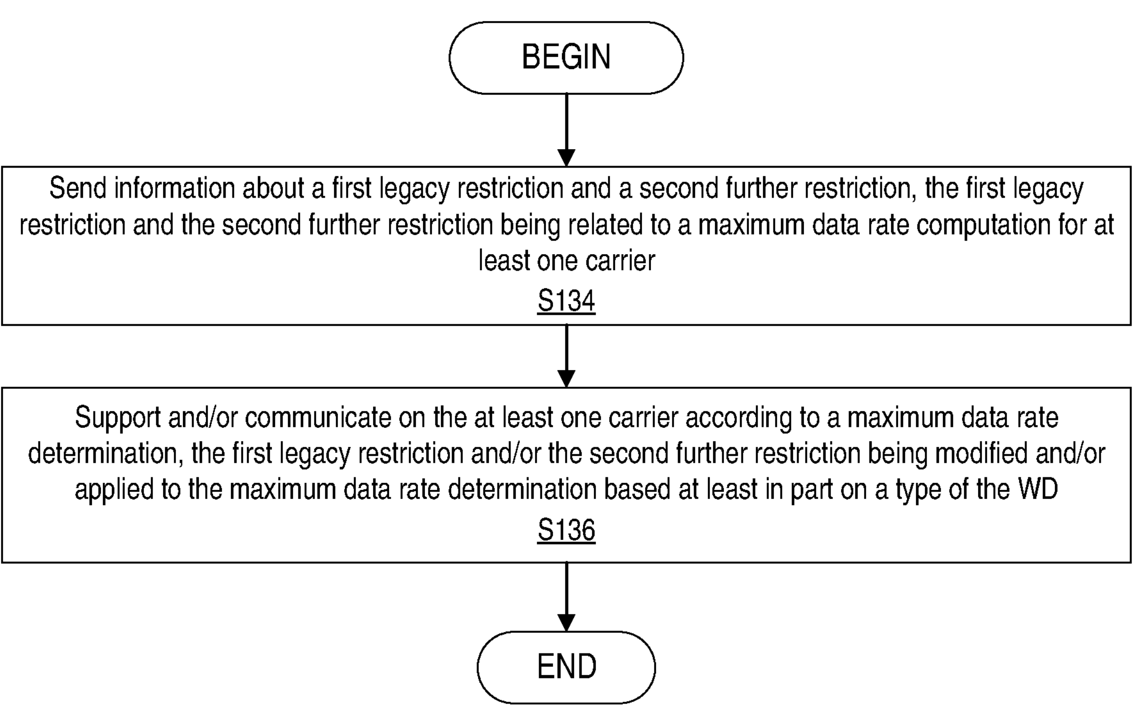
FIG. 7 is a flowchart of an example process in a network node according to some embodiments of the present disclosure.

FIG. 7 is a flowchart of an example process in a network node 16. One or more blocks described herein may be performed by one or more elements of network node 16 such as by one or more of processing circuitry 68 (including the configuration unit 32), processor 70, radio interface 62 and/or communication interface 60. Network node 16 such as via processing circuitry 68 and/or processor 70 and/or radio interface 62 and/or communication interface 60 is configured to send (Block S134) information about a first legacy restriction and a second further restriction, the first legacy restriction and the second further restriction being related to a maximum data rate computation for at least one carrier. Network node 16 such as via processing circuitry 68 and/or processor 70 and/or radio interface 62 and/or communication interface 60 is configured to support and/or communicate (Block S136) on the at least one carrier according to a maximum data rate determination, the first legacy restriction and/or the second further restriction being modified and/or applied to the maximum data rate determination based at least in part on a type of the WD.

In some embodiments, the first legacy restriction comprises restricting the WD to a product of a maximum number of supported MIMO layers, a scaling factor and a maximum supported modulation order is no smaller than 4. In some embodiments, the second further restriction comprises restricting the WD from reporting at least one of: a first lowest maximum supported modulation order value, a second lowest maximum supported modulation order value, a first lowest scaling factor value, a second lowest scaling factor value and a third lowest scaling factor value.

In some embodiments, the first legacy restriction is associated with a first set of maximum supported modulation order values and a second set of scaling factor values and the second further restriction comprises restricting the WD from reporting at least one of: a first lowest maximum supported modulation order value in the first set, a second lowest maximum supported modulation order value in the first set, a first lowest scaling factor value in the second set, a second lowest scaling factor value in the second set and a third lowest scaling factor value in the second set.

In some embodiments, the second further restriction comprises restricting the WD to a product of a maximum number of supported MIMO layers, a scaling factor and a maximum supported modulation order is no smaller than a number that is smaller than 4. In some embodiments, the number that is smaller than 4 is 1. In some embodiments, the second further restriction comprises a minimum data rate requirement for the type of WD 22, the minimum data rate requirement being pre-defined at the WD 22 and/or network node 16; or semi-statically configured by the network node 16.

In some embodiments, network node 16 such as via processing circuitry 68 and/or processor 70 and/or radio interface 62 and/or communication interface 60 is configured to one or more of: send signaling explicitly or implicitly indicating whether the first legacy and/or second further restriction is applicable to the type of WD; and/or receive a report from the WD comprising a set of capability parameters, the capability parameters being based at least in part on the first legacy restriction and/or the second further restriction. In some embodiments, one or more of: the explicit or implicit signaling is sent in system information; the set of capability parameters comprises a parameter indicating information about how the WD's Layer 2 or HARQ buffer size is to be computed; the type of WD 22 is a reduced capability, RedCap, WD type; and whether the first legacy restriction and/or the second further restriction is applicable to the WD is based further on a type of the data transmission.

Figure 8:
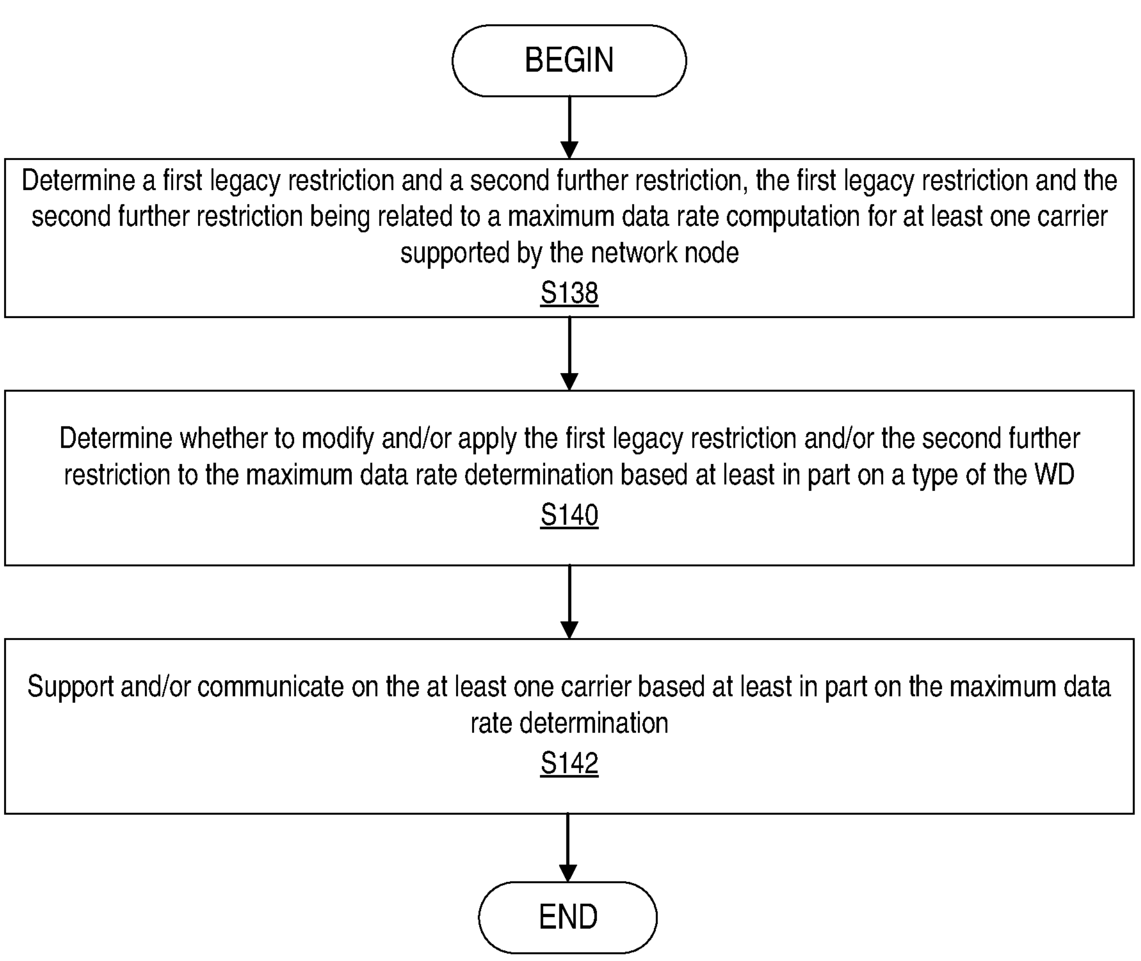
FIG. 8 is a flowchart of an example process in a wireless device according to some embodiments of the present disclosure.

FIG. 8 is a flowchart of an example process in a wireless device 22 according to some embodiments of the present disclosure. One or more blocks described herein may be performed by one or more elements of wireless device 22 such as by one or more of processing circuitry 84 (including the determination unit 34), processor 86, radio interface 82 and/or communication interface 60. Wireless device 22 such as via processing circuitry 84 and/or processor 86 and/or radio interface 82 is configured to determine (Block S138) a first legacy restriction and a second further restriction, the first legacy restriction and the second further restriction being related to a maximum data rate computation for at least one carrier supported by the network node 16. Wireless device 22 such as via processing circuitry 84 and/or processor 86 and/or radio interface 82 is configured to determine (Block S140) whether to modify and/or apply the first legacy restriction and/or the second further restriction to the maximum data rate determination based at least in part on a type of the WD. Wireless device 22 such as via processing circuitry 84 and/or processor 86 and/or radio interface 82 is configured to support and/or communicate (Block S142) on the at least one carrier based at least in part on the maximum data rate determination.

In some embodiments, the first legacy restriction comprises restricting the WD to a product of a maximum number of supported MIMO layers, a scaling factor and a maximum supported modulation order is no smaller than 4. In some embodiments, the second further restriction comprises restricting the WD from reporting at least one of: a first lowest maximum supported modulation order value, a second lowest maximum supported modulation order value, a first lowest scaling factor value, a second lowest scaling factor value and a third lowest scaling factor value.

In some embodiments, the first legacy restriction is associated with a first set of maximum supported modulation order values and a second set of scaling factor values and the second further restriction comprises restricting the WD from reporting at least one of: a first lowest maximum supported modulation order value in the first set, a second lowest maximum supported modulation order value in the first set, a first lowest scaling factor value in the second set, a second lowest scaling factor value in the second set and a third lowest scaling factor value in the second set.

In some embodiments, the second further restriction comprises restricting the WD to a product of a maximum number of supported MIMO layers, a scaling factor and a maximum supported modulation order is no smaller than a number that is smaller than 4. In some embodiments, the number that is smaller than 4 is 1. In some embodiments, the second further restriction comprises a minimum data rate requirement for the type of WD, the minimum data rate requirement being pre-defined or semi-statically configured.

In some embodiments, the WD and/or radio interface and/or processing circuitry is further configured to cause the WD to one or more of: receive signaling explicitly or implicitly indicating whether the first legacy and/or second further restriction is applicable to the type of WD; and/or report a set of capability parameters to the network node 16, the capability parameters being based at least in part on the first legacy restriction and/or the second further restriction. In some embodiments, one or more of: the explicit or implicit signaling is received in system information; the set of capability parameters comprises a parameter indicating information about how the WD's Layer 2 or HARQ buffer size is to be computed; the type of WD is a reduced capability, RedCap, WD type; and whether the first legacy restriction and/or the second further restriction is applicable to the WD is based further on a type of the data transmission.

Figure 9:
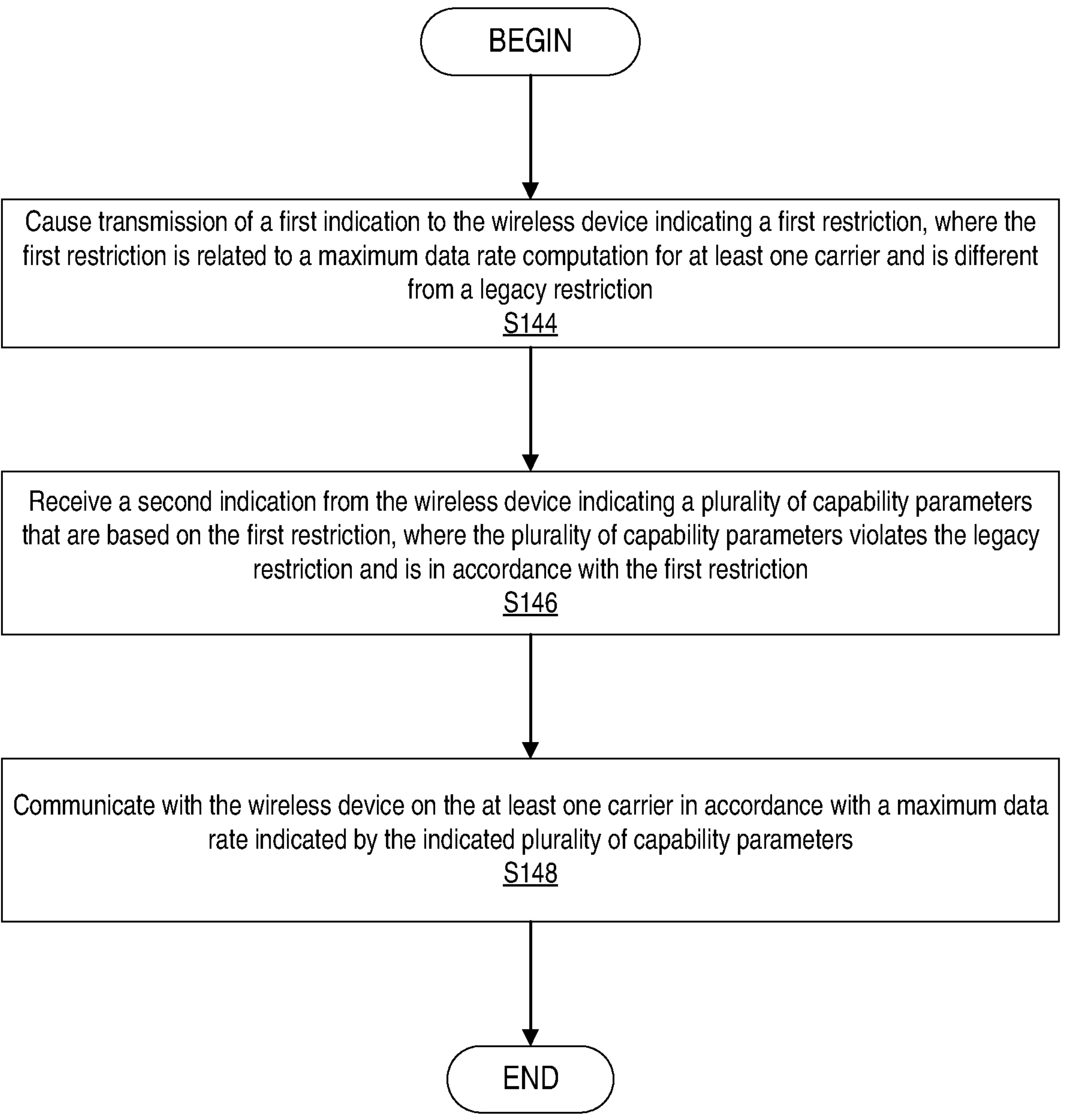
FIG. 9 is a flowchart of another example process in a network node according to some embodiments of the present disclosure.

FIG. 9 is a flowchart of another example process in a network node 16. One or more blocks described herein may be performed by one or more elements of network node 16 such as by one or more of processing circuitry 68 (including the configuration unit 32), processor 70, radio interface 62 and/or communication interface 60. Network node 16 is configured to cause transmission (Block S144) of a first indication to the wireless device 22 indicating a first restriction, where the first restriction is related to a maximum data rate computation for at least one carrier and is different from a legacy restriction. Network node 16 is further configured to receive (Block S146) a second indication from the wireless device 22 indicating a plurality of capability parameters that are based on the first restriction, where the plurality of capability parameters violates the legacy restriction and is in accordance with the first restriction. Network node 16 is further configured to communicate (Block S148) with the wireless device 22 on the at least one carrier in accordance with a maximum data rate indicated by the indicated plurality of capability parameters.

According to one or more embodiments, the network node 16 is further configured to determine the maximum data rate based on the indicated plurality of capability parameters. According to one or more embodiments, the plurality of capability parameters includes at least one of a maximum number of supported multiple-input-multiple-output, MIMO, layers, a scaling factor, and a maximum supported modulation order. According to one or more embodiments, the legacy restriction restricts a product of the maximum number of supported MIMO layers, the scaling factor, and the maximum supported modulation order to be greater than a first number. The first restriction restricts the product to be greater than a second number, where the second number is less than the first number. According to one or more embodiments, the first number is 4. According to one or more embodiments, the second number is 1. According to one or more embodiments, the maximum supported modulation order is one of a plurality of modulation orders including a lowest maximum supported modulation order and a second-lowest maximum supported modulation order. The first restriction restricts the wireless device 22 from one of indicating the lowest maximum supported modulation order and indicating the lowest maximum supported modulation order and the second-lowest maximum supported modulation order. According to one or more embodiments, the scaling factor is one of a plurality of scaling factors including a lowest scaling factor, a second-lowest scaling factor, and a third-lowest scaling factor, and the first restriction restricting the wireless device 22 from indicating at least one of the lowest scaling factor, the second-lowest scaling factor value, and the third-lowest scaling factor.

According to one or more embodiments, the scaling factor is one of a plurality of scaling factors including a lowest scaling factor, a second-lowest scaling factor, and a third-lowest scaling factor, and a fourth-lowest scaling factor. The second indication omits the scaling factor based on the first restriction restricting the wireless device 22 from indicating the lowest scaling factor, the second-lowest scaling factor value, and the third-lowest scaling factor value. The maximum data rate determination is based on the fourth-lowest scaling factor.

According to one or more embodiments, the first indication indicates a plurality of data transmission types, and each one of the plurality of data transmission types is associated with one of the legacy restriction and the first restriction. The communicating with the wireless device 22 is associated with a first data transmission type, and the maximum data rate determination is based on which one of the legacy restriction and the first restriction the first data transmission type is associated with.

According to one or more embodiments, the first indication indicates at least one network parameter including at least one of a maximum number of multiple-input-multiple-output, MIMO, layers used in a cell, a maximum number of hybrid automatic repeat request, HARQ, processes used for transmission in the cell, and a maximum modulation order used in a cell. The plurality of capability parameters are further determined based on the at least one network parameter. According to one or more embodiments, the wireless device 22 is a Reduced Capability (RedCap) wireless device 22.

Figure 10:
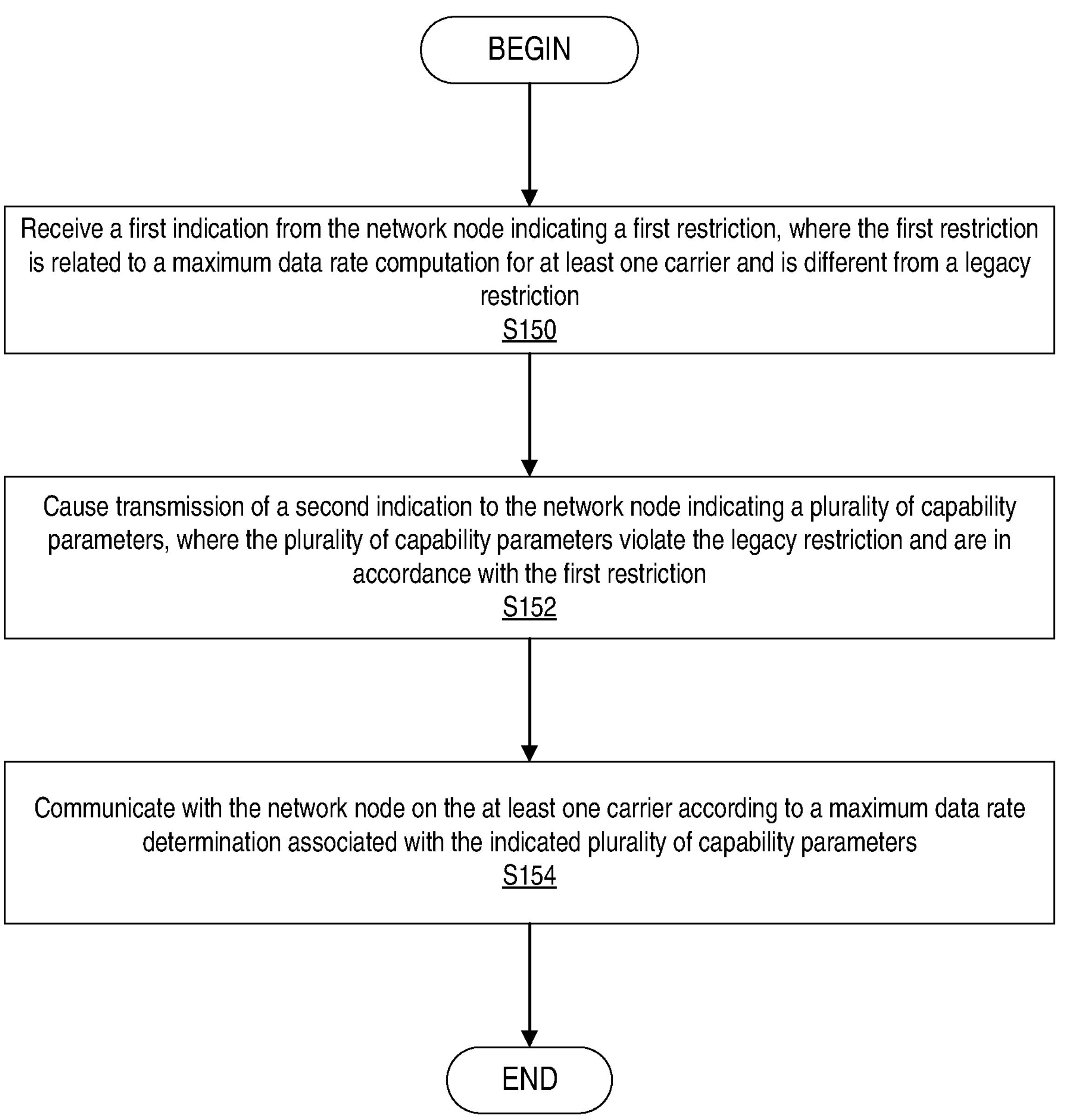
FIG. 10 is a flowchart of another example process in a wireless device according to some embodiments of the present disclosure.

FIG. 10 is a flowchart of another example process in a wireless device 22 according to some embodiments of the present disclosure. One or more blocks described herein may be performed by one or more elements of wireless device 22 such as by one or more of processing circuitry 84 (including the determination unit 34), processor 86, radio interface 82 and/or communication interface 60. Wireless device 22 is configured to receive (Block S150) a first indication from the network node 16 indicating a first restriction, where the first restriction is related to a maximum data rate computation for at least one carrier and is different from a legacy restriction. Wireless device 22 is further configured to cause transmission (Block S152) of a second indication to the network node 16 indicating a plurality of capability parameters, where the plurality of capability parameters violate the legacy restriction and are in accordance with the first restriction. Wireless device 22 is further configured to communicate (Block S154) with the network node 16 on the at least one carrier according to a maximum data rate determination associated with the indicated plurality of capability parameters.

According to one or more embodiments, the wireless device 22 is further configured to determine the plurality of capability parameters based on the first restriction. According to one or more embodiments, the plurality of capability parameters includes at least one of a maximum number of supported multiple-input-multiple-output, MIMO, layers, a scaling factor, and a maximum supported modulation order. According to one or more embodiments, the legacy restriction restricts a product of the maximum number of supported MIMO layers, the scaling factor, and the maximum supported modulation order to be greater than a first number. The first restriction restricts the product to be greater than a second number, and the second number is less than the first number. According to one or more embodiments, the first number is 4. According to one or more embodiments, the second number is 1.

According to one or more embodiments, the maximum supported modulation order is one of a plurality of modulation orders including a lowest maximum supported modulation order and a second-lowest maximum supported modulation order. The first restriction restricts the wireless device 22 from one of indicating the lowest maximum supported modulation order, and indicating the lowest maximum supported modulation order and the second-lowest maximum supported modulation order. According to one or more embodiments, the scaling factor is one of a plurality of scaling factors including a lowest scaling factor, a second-lowest scaling factor, and a third-lowest scaling factor. The first restriction restricts the wireless device 22 from indicating at least one of the lowest scaling factor, the second-lowest scaling factor value, and the third-lowest scaling factor.

According to one or more embodiments, the scaling factor is one of a plurality of scaling factors including a lowest scaling factor, a second-lowest scaling factor, and a third-lowest scaling factor, and a fourth-lowest scaling factor. The second indication omits the scaling factor based on the first restriction restricting the wireless device 22 from indicating the lowest scaling factor, the second-lowest scaling factor value, and the third-lowest scaling factor value. The maximum data rate determination is based on the fourth-lowest scaling factor.

According to one or more embodiments, the first indication indicates a plurality of data transmission types, where each one of the plurality of data transmission types is associated with one of the legacy restriction and the first restriction. The communicating with the network node 16 is associated with a first data transmission type. The maximum data rate determination is based on which one of the legacy restriction and the first restriction the first data transmission type is associated with.

According to one or more embodiments, the first indication indicates at least one network parameter including at least one of a maximum number of multiple-input-multiple-output, MIMO, layers used in a cell, a maximum number of hybrid automatic repeat request, HARQ, processes used for transmission in the cell, and a maximum modulation order used in a cell. The plurality of capability parameters is further determined based on the at least one network parameter. According to one or more embodiments, the wireless device 22 is a Reduced Capability (RedCap) wireless device 22.

Having described the general process flow of arrangements of the disclosure and having provided examples of hardware and software arrangements for implementing the processes and functions of the disclosure, the sections below provide details and examples of arrangements for maximum data rate determination, which may be performed by any of the one or more elements of wireless device 22 and/or network node 16.

First Example Embodiment

In a first example embodiment, the restriction related to supported data rate (as described above) is removed or modified in the DL and/or the UL for the RedCap WDs 22. For example, WDs 22 that are RedCap may disregard, ignore, not apply or modify the restriction in TS 38.306 that the product of the maximum number of supported MIMO layers, scaling factor and maximum supported modulation order is not smaller than 4. The RedCap WDs 22 may be restricted from reporting pi/2-BPSK and BPSK $$\left(\text{corresponding to } Q_m^{(j)} = 1\right)$$

for the maximum supported modulation order in the DL and/or the UL. This corresponds to a maximum data rate of at least ~10 Mbps in DL/UL that is supported by a RedCap WD 22. Note that ~10 Mbps is obtained by substituting the lowest maximum supported modulation order of QPSK, corresponding to $$Q_m^{(j)} = 2,$$

[since pi/2-BPSK and BPSK which correspond to value 1 of the maximum supported modulation order values is not reported or applied, thus, the lowest maximum supported modulation order is 2 corresponding to QPSK] and the lowest scaling factor value of 0.4 in the maximum data rate expression above).

In one alternative of the first embodiment, the restriction (as described above) is removed or modified in the DL and/or the UL for the RedCap WDs 22. For example, WDs 22 that are RedCap may disregard, ignore or not apply or modify the restriction in TS 38.306 that the product of the maximum number of supported MIMO layers, scaling factor and maximum supported modulation order is not smaller than 4. The RedCap WDs 22 are restricted from reporting pi/2-BPSK/BPSK and QPSK $$\left(\text{corresponding to } Q_m^{(j)} = 1 \text{ and } Q_m^{(j)} = 2, \text{ respectively}\right)$$

as the maximum supported modulation order in the DL and/or the UL. This restriction corresponds to a maximum data rate of at least ~21 Mbps in DL/UL that is supported by a RedCap WD 22. Note that ~21 Mbps is obtained by substituting the lowest maximum supported modulation order of 16QAM, corresponding to $$Q_m^{(j)} = 4,$$

[since pi/2-BPSK and BPSK which correspond to value 1 and QPSK which correspond to 2 of the maximum supported modulation order values is not reported or applied, thus, the lowest maximum supported modulation order is 3 corresponding to 16QAM] and the lowest scaling value of 0.4 in the maximum data rate expression above.

Second Example Embodiment

In a second example embodiment, the restriction (as described above), is removed or modified in the DL and/or the UL for the RedCap WDs 22. For example, WDs 22 that are RedCap may disregard, ignore or not apply or modify the restriction in 3GPP TS 38.306 that the product of the maximum number of supported MIMO layers, scaling factor and maximum supported modulation order is not smaller than 4. The RedCap WDs 22 may be restricted from reporting the scaling factor value 0.4 in the DL and/or the UL. This corresponds to a maximum data rate of least ~10 Mbps in DL/UL that is supported by a RedCap WD 22. Note that ~10 Mbps is obtained by substituting the lowest maximum supported modulation order of pi/2-BPSK/BPSK, corresponding to $$Q_m^{(j)} = 1,$$

and the lowest scaling value of 0.75 in the maximum data rate expression above).

In one alternative of the second example embodiment, the restriction (as described in Section 2.2) is removed or modified in the DL and/or the UL for the RedCap WDs 22. The RedCap WDs 22 may be restricted from reporting the scaling factor values 0.4, and 0.75 and/or 0.8, in the DL and/or the UL. In this case, a RedCap WD 22 is only allowed to report the scaling factor value 1. Since there is no ambiguity in the scaling factor that can be reported from a RedCap WD 22, such a reporting can be omitted.

Third Example Embodiment

In the third embodiment, the restriction (as described above) is modified as $$v_{Layers}^{(j)} \cdot Q_m^{(j)} \cdot f^{(j)}$$

is no smaller than 1 (i.e., the product of the maximum number of supported MIMO layers, the scaling factor and the maximum supported modulation order is no smaller than 1) in the DL and/or the UL for the RedCap WDs 22. This corresponds to a maximum data rate of at least ~13 Mbps in DL/UL that is supported by a RedCap WD 22.

Fourth Example Embodiment

In a fourth (complementary) example embodiment, an indication in system information (e.g., SIB1) is used to indicate whether the restriction (as described above) is applicable or not for the RedCap WDs 22. The indication may also be separate for the DL and the UL. If the restriction is applicable, only those RedCap WDs 22 that can satisfy that the product of the maximum number of supported MIMO layers, the scaling factor and the maximum supported modulation order is no smaller than 4 are allowed to camp on the cell/frequency. Note that if there is an indication only if the restriction is relaxed, legacy network node 16 (e.g., gNB) would not include the indication in system information and automatically avoid RedCap WDs 22 applying the relaxed condition from in the cell (which would lead to incompatibility since a legacy network node 16 (e.g., gNB) would assume all WDs 22 apply the legacy condition).

In an alternative embodiment, the indication in system information is indicating whether the restriction as described above is modified in some other way for the RedCap WDs 22. For example, such restriction may be in terms of a fixed or predetermined minimum value other than 4 for the aforementioned product of the maximum number of supported MIMO layers, the scaling factor and the maximum supported modulation order, or selected from a set of possible minimum values.

The indication in SIB may additionally or alternatively indicate other details on what type of restriction applies in the cell. This may, for example, pertain to the legacy restriction or any of the restrictions outlined in any of the previous embodiments herein.

In another alternative embodiment, the indication in system information is implicit, that is, the RedCap WD 22 interprets some other indication related to RedCap WDs 22 to imply whether the restriction is applicable or not. For example, if a network node 16 (e.g., gNB) indicates that RedCap WDs 22 are allowed to camp in a cell, this is then additionally interpreted to indicate whether the restriction is applicable or not. Such interpretation can be captured in the specification.

Fifth Example Embodiment

In a fifth embodiment, the legacy restriction and/or any of the restrictions according to embodiments of the present disclosure is applied selectively depending on a type of the data transmission. As a non-limiting example, a particular restriction may apply to data transmission associated with unicast transmission to a particular WD 22, for example as addressed using a particular WD-specific radio network temporary identifier, RNTI, such as a Cell RNTI, C-RNTI. The condition may not apply when the WD 22 is receiving some other type of data transmission, such as system information transmission, addressed using a System Information RNTI, SI-RNTI, or a paging transmission, addressed using a Paging RNTI, P-RNTI. According to one application of this embodiment, a WD 22 may be allowed to discard one data transmission while receiving another data transmission for which a restriction related to supported data rate does not apply.

Sixth Example Embodiment

In a sixth embodiment, the RedCap WD 22 reports a set of capability parameters, such as a scaling factor which is consistent with any of the above example restrictions on the WD 22 data rate, where the values for at least one of the capability parameters is based on one or more network parameter provided to the RedCap WD 22 in system information. The one or more network parameter may, for example, relate to an indication in system information of the applicable restriction, according to the embodiments above. In another example, the one or more network parameters relate to some configuration parameter related to the UL or DL data transmission. As non-limiting examples, such parameters may include indications of a maximum number of MIMO layers used in a cell or for a WD 22 or group of WDs 22 in a cell, a maximum number of HARQ processes used for UL or DL transmission in a cell or for a WD 22 or group of WDs 22 in a cell, and/or a maximum modulation order used in a cell or for a WD 22 or group of WDs 22 in a cell.

Seventh Example Embodiment

In a seventh example embodiment, a new parameter is introduced which the RedCap WD 22 reports to the network, indicating the WD 22 calculates the L2 or HARQ buffer sizes differently compared to how it is currently captured in the specifications. This indication can be reported for example in the capability parameters signaling. The parameter may be a value which is applied in the calculation of the L2 and/or HARQ buffer size.

When the WD 22 signals such parameter, it may additionally affect the maximum UL or DL data rate the WD 22 supports or the calculation of the supported maximum data rate in the specification. In particular, in addition to signaling the new parameter, the WD 22 may also indicate support for scalingFactor such that the restrictions mentioned in the previous embodiments should not be applicable. Therefore, when the WD 22 signals or reports the new parameter, the restrictions mentioned in the previous embodiments are lifted or modified for the WD 22 for example according to any of embodiments 1-3.

Eighth Example Embodiment

In the eighth embodiment, the restriction related to supported data rate (as described in Section 2.2) is removed in the DL and/or the UL for the RedCap WDs 22. Instead, the RedCap WDs 22 are restricted to support at least a specified minimum data rate requirement, e.g., 10 Mbps. The minimum data rate requirement could either be hard coded in specification (e.g. connected to the RedCap WD 22 type), or semi-statically configured (see the fourth embodiment).

General Aspects

The different embodiments listed herein may correspond to methods performed in a network node 16 and/or a wireless device 22. As an example, a WD 22 may decide to camp on a cell, and/or attempt to connect to a cell depending on whether the WD 22 fulfills conditions associated with one or more restriction that applies according to any of the embodiments herein. As another example, a network node 16 may schedule a WD 22 with data transmissions such that the data rates of these transmissions do not exceed the maximum supported data rate as indicated by any of the embodiments herein.

Different embodiments and/or different variants of the embodiments may be applied for the DL data rate and the UL data rate. Different embodiments and/or different variants of the embodiments may be applied in different operating bands.

SOME EXAMPLES

Example A1. A network node 16 configured to communicate with a wireless device 22 (WD), the network node 16 configured to, and/or comprising a radio interface and/or comprising processing circuitry configured to: send information about a first legacy restriction and a second further restriction, the first legacy restriction and the second further restriction being related to a maximum data rate computation for at least one carrier; and support and/or communicate on the at least one carrier according to a maximum data rate determination, the first legacy restriction and/or the second further restriction being modified and/or applied to the maximum data rate determination based at least in part on a type of the WD 22.

Example A2. The network node 16 of Example A1, wherein the first legacy restriction comprises restricting the WD 22 to a product of a maximum number of supported MIMO layers, a scaling factor and a maximum supported modulation order is no smaller than 4.

Example A3. The network node 16 of any one of Examples A1 and A2, wherein the second further restriction comprises restricting the WD 22 from reporting at least one of: a first lowest maximum supported modulation order value, a second lowest maximum supported modulation order value, a first lowest scaling factor value, a second lowest scaling factor value and a third lowest scaling factor value.

Example A4. The network node 16 of any one of Examples A1 and A2, wherein the first legacy restriction is associated with a first set of maximum supported modulation order values and a second set of scaling factor values and the second further restriction comprises restricting the WD 22 from reporting at least one of: a first lowest maximum supported modulation order value in the first set, a second lowest maximum supported modulation order value in the first set, a first lowest scaling factor value in the second set, a second lowest scaling factor value in the second set and a third lowest scaling factor value in the second set.

Example A5. The network node 16 of any one of Examples A1 and A2, wherein the second further restriction comprises restricting the WD 22 to a product of a maximum number of supported MIMO layers, a scaling factor and a maximum supported modulation order is no smaller than a number that is smaller than 4.

Example A6. The network node 16 of Example A5, wherein the number that is smaller than 4 is 1.

Example A7. The network node 16 of any one of Examples A1 and A2, wherein the second further restriction comprises a minimum data rate requirement for the type of WD 22, the minimum data rate requirement being predefined at the WD 22 and/or network node 16; or semi-statically configured by the network node 16.

Example A8. The network node 16 of any one of Examples A1-A7, wherein the network node 16 and/or radio interface and/or processing circuitry is further configured to cause the network node 16 to one or more of: send signaling explicitly or implicitly indicating whether the first legacy and/or second further restriction is applicable to the type of WD 22; and/or receive a report from the WD 22 comprising a set of capability parameters, the capability parameters being based at least in part on the first legacy restriction and/or the second further restriction.

Example A9. The network node 16 of any one of Examples A1-A9, wherein one or more of: the explicit or implicit signaling is sent in system information; the set of capability parameters comprises a parameter indicating information about how the WD 22's Layer 2 or HARQ buffer size is to be computed; the type of WD 22 is a reduced capability, RedCap, WD 22 type; and whether the first legacy restriction and/or the second further restriction is applicable to the WD 22 is based further on a type of the data transmission.

Example B1. A method implemented in a network node 16, the method comprising: sending information about a first legacy restriction and a second further restriction, the first legacy restriction and the second further restriction being related to a maximum data rate computation for at least one carrier; and supporting and/or communicating on the at least one carrier according to a maximum data rate determination, the first legacy restriction and/or the second further restriction being modified and/or applied to the maximum data rate determination based at least in part on a type of the WD 22.

Example B2. The method of Example B1, wherein the first legacy restriction comprises restricting the WD 22 to a product of a maximum number of supported MIMO layers, a scaling factor and a maximum supported modulation order is no smaller than 4.

Example B3. The method of any one of Examples B1 and B2, wherein the second further restriction comprises restricting the WD 22 from reporting at least one of: a first lowest maximum supported modulation order value, a second lowest maximum supported modulation order value, a first lowest scaling factor value, a second lowest scaling factor value and a third lowest scaling factor value.

Example B4. The method of any one of Examples B1 and B2, wherein the first legacy restriction is associated with a first set of maximum supported modulation order values and a second set of scaling factor values and the second further restriction comprises restricting the WD 22 from reporting at least one of: a first lowest maximum supported modulation order value in the first set, a second lowest maximum supported modulation order value in the first set, a first lowest scaling factor value in the second set, a second lowest scaling factor value in the second set and a third lowest scaling factor value in the second set.

Example B5. The method of any one of Examples B1 and B2, wherein the second further restriction comprises restricting the WD 22 to a product of a maximum number of supported MIMO layers, a scaling factor and a maximum supported modulation order is no smaller than a number that is smaller than 4.

Example B6. The method of Example B5, wherein the number that is smaller than 4 is 1.

Example B7. The method of any one of Examples B1 and B2, wherein the second further restriction comprises a minimum data rate requirement for the type of WD 22, the minimum data rate requirement being pre-defined at the WD 22 and/or network node 16; or semi-statically configured by the network node 16.

Example B8. The method of any one of Examples B1-B7, further comprising one or more of: sending signaling explicitly or implicitly indicating whether the first legacy and/or second further restriction is applicable to the type of WD 22; and/or receiving a report from the WD 22 comprising a set of capability parameters, the capability parameters being based at least in part on the first legacy restriction and/or the second further restriction.

Example B9. The method of any one of Examples B1-B9, wherein one or more of: the explicit or implicit signaling is sent in system information; the set of capability parameters comprises a parameter indicating information about how the WD 22's Layer 2 or HARQ buffer size is to be computed; the type of WD 22 is a reduced capability, RedCap, WD 22 type; and whether the first legacy restriction and/or the second further restriction is applicable to the WD 22 is based further on a type of the data transmission.

Example C1. A wireless device 22 (WD) configured to communicate with a network node 16, the WD 22 configured to, and/or comprising a radio interface and/or processing circuitry configured to: determine a first legacy restriction and a second further restriction, the first legacy restriction and the second further restriction being related to a maximum data rate computation for at least one carrier supported by the network node 16; determine whether to modify and/or apply the first legacy restriction and/or the second further restriction to the maximum data rate determination based at least in part on a type of the WD 22; and support and/or communicate on the at least one carrier based at least in part on the maximum data rate determination.

Example C2. The WD 22 of Example C1, wherein the first legacy restriction comprises restricting the WD 22 to a product of a maximum number of supported MIMO layers, a scaling factor and a maximum supported modulation order is no smaller than 4.

Example C3. The WD 22 of any one of Examples C1 and C2, wherein the second further restriction comprises restricting the WD 22 from reporting at least one of: a first lowest maximum supported modulation order value, a second lowest maximum supported modulation order value, a first lowest scaling factor value, a second lowest scaling factor value and a third lowest scaling factor value.

Example C4. The WD 22 of any one of Examples C1 and C2, wherein the first legacy restriction is associated with a first set of maximum supported modulation order values and a second set of scaling factor values and the second further restriction comprises restricting the WD 22 from reporting at least one of: a first lowest maximum supported modulation order value in the first set, a second lowest maximum supported modulation order value in the first set, a first lowest scaling factor value in the second set, a second lowest scaling factor value in the second set and a third lowest scaling factor value in the second set.

Example C5. The WD 22 of any one of Examples C1 and C2, wherein the second further restriction comprises restricting the WD 22 to a product of a maximum number of supported MIMO layers, a scaling factor and a maximum supported modulation order is no smaller than a number that is smaller than 4.

Example C6. The WD 22 of Example C5, wherein the number that is smaller than 4 is 1.

Example C7. The WD 22 of any one of Examples C1 and C2, wherein the second further restriction comprises a minimum data rate requirement for the type of WD 22, the minimum data rate requirement being pre-defined or semi-statically configured.

Example C8. The WD 22 of any one of Examples C1-C7, wherein the WD 22 and/or radio interface and/or processing circuitry is further configured to cause the WD 22 to one or more of: receive signaling explicitly or implicitly indicating whether the first legacy and/or second further restriction is applicable to the type of WD 22; and/or report a set of capability parameters to the network node 16, the capability parameters being based at least in part on the first legacy restriction and/or the second further restriction.

Example C9. The WD 22 of any one of Examples C1-C9, wherein one or more of: the explicit or implicit signaling is received in system information; the set of capability parameters comprises a parameter indicating information about how the WD 22's Layer 2 or HARQ buffer size is to be computed; the type of WD 22 is a reduced capability, RedCap, WD 22 type; and whether the first legacy restriction and/or the second further restriction is applicable to the WD 22 is based further on a type of the data transmission.

Example D1. A method implemented in a wireless device 22 (WD), the method comprising: determining a first legacy restriction and a second further restriction, the first legacy restriction and the second further restriction being related to a maximum data rate computation for at least one carrier supported by the network node 16; determining whether to modify and/or apply the first legacy restriction and/or the second further restriction to the maximum data rate determination based at least in part on a type of the WD 22; and supporting and/or communicating on the at least one carrier based at least in part on the maximum data rate determination.

Example D2. The method of Example D1, wherein the first legacy restriction comprises restricting the WD 22 to a product of a maximum number of supported MIMO layers, a scaling factor and a maximum supported modulation order is no smaller than 4.

Example D3. The method of any one of Examples D1 and D2, wherein the second further restriction comprises restricting the WD 22 from reporting at least one of: a first lowest maximum supported modulation order value, a second lowest maximum supported modulation order value, a first lowest scaling factor value, a second lowest scaling factor value and a third lowest scaling factor value.

Example D4. The method of any one of Examples D1 and D2, wherein the first legacy restriction is associated with a first set of maximum supported modulation order values and a second set of scaling factor values and the second further restriction comprises restricting the WD 22 from reporting at least one of: a first lowest maximum supported modulation order value in the first set, a second lowest maximum supported modulation order value in the first set, a first lowest scaling factor value in the second set, a second lowest scaling factor value in the second set and a third lowest scaling factor value in the second set.

Example D5. The method of any one of Examples D1 and D2, wherein the second further restriction comprises restricting the WD 22 to a product of a maximum number of supported MIMO layers, a scaling factor and a maximum supported modulation order is no smaller than a number that is smaller than 4.

Example D6. The method of Example D5, wherein the number that is smaller than 4 is 1.

Example D7. The method of any one of Examples D1 and D2, wherein the second further restriction comprises a minimum data rate requirement for the type of WD 22, the minimum data rate requirement being pre-defined or semi-statically configured.

Example D8. The method of any one of Examples D1-D7, further comprising: receiving signaling explicitly or implicitly indicating whether the first legacy and/or second further restriction is applicable to the type of WD 22; and/or reporting a set of capability parameters to the network node 16, the capability parameters being based at least in part on the first legacy restriction and/or the second further restriction.

Example D9. The method of any one of Examples D1-D9, wherein one or more of: the explicit or implicit signaling is received in system information; the set of capability parameters comprises a parameter indicating information about how the WD 22's Layer 2 or HARQ buffer size is to be computed; the type of WD 22 is a reduced capability, RedCap, WD 22 type; and whether the first legacy restriction and/or the second further restriction is applicable to the WD 22 is based further on a type of the data transmission.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| 3GPP | 3rd Generation Partnership Project |
| BPSK | Binary phase-shift keying |
| BWP | Bandwidth Part |
| CBRA | Contention Based Random Access |
| CCCH | Common Control Channel |
| C-RNTI | Cell RNTI |
| CG | Configured Grant |
| CORESET | Control Resource Set |
| CRC | Cyclic Redundancy Check |
| CSS | Common Search Space |
| DCI | Downlink Control Information |
| DL | Downlink |
| DL-SCH | Downlink Shared channel |
| eMBB | enhanced Mobile Broadband |
| eRedCap | Enhanced Reduced Capability NR Devices |
| IE | Information Element |
| I-RNTI | Inactive RNTI |
| LCID | Logical Channel ID |
| LPWA | Low power wide area |
| LTE | Long-Term Evolution |

-continued

| Abbreviation | Explanation |
|---|---|
| MAC | Medium Access Control |
| MAC-CE | Medium Access Control - Control Element |
| MICO | Mobile Originated Communication Only |
| MIMO | Multiple-Input and Multiple-Output |
| mMTC | massive Machine-Type Communication |
| Msg1/2/3/4/5 | Message 1/2/3/4/5 of 4-step random access procedure |
| MsgA/B | Message A/B of 2-step random access procedure |
| MTC | Machine-Type Communications |
| NB-IOT | Narrowband Internet of Things |
| NR | New Radio |
| NUL | Normal Uplink |
| NW | Network |
| OFDM | Orthogonal Frequency-Division Multiplexing |
| PDCCH | Physical Downlink Control Channel |
| PDSCH | Physical Downlink Shared Channel |
| PDU | Protocol Data Unit |
| pi/2-BPSK | T/2-Binary phase-shift keying |
| PRACH | Physical Random Access Channel |
| PRB | Physical Resource Block |
| PSM | Power Saving Mode |
| PUCCH | Physical Uplink Control Channel |
| PUSCH | Physical Uplink Shared Channel |
| QAM | Quadrature Amplitude Modulation |
| QPSK | Quadrature Phase Shift Keying |
| RA | Random Access |
| RACH | Random Access Channel |
| RAI | Release Assistance Information |
| RAPID | Random Access Preamble Identifier |
| RAR | Random Access Response |
| RA-RNTI | Random Access RNTI |
| RedCap | Reduced Capability NR Devices |
| RNTI | Radio Network Temporary Identifier |
| RRC | Radio Resource Control |
| SDT | Small Data Transmission |
| SCS | Subcarrier Spacing |
| SI | System information |
| SIB | System information block |
| SRS | Sounding Reference Signal |
| SSB | Synchronization Signal Block |
| SUL | Supplementary Uplink |
| TC-RNTI | Temporary Cell RNTI |
| UAI | UE Assistance Information |
| UCI | Uplink Control information |
| UE | User equipment |
| UL | Uplink |
| UL-SCH | Uplink Shared channel |
| URLLC | Ultra-Reliable Low-Latency Communication |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed:

1. A method implemented in a network node configured to communicate with a wireless device, the method comprising:

causing transmission of a first indication to the wireless device indicating a first restriction, the first restriction being related to a maximum data rate computation for at least one carrier and being different from a legacy restriction;

receiving a second indication from the wireless device indicating a plurality of capability parameters, the plurality of capability parameters violating the legacy restriction and being in accordance with the first restriction;

communicating with the wireless device on the at least one carrier in accordance with a maximum data rate associated with the indicated plurality of capability parameters;

the plurality of capability parameters includes at least one of:

a maximum number of supported multiple-input-multiple-output, MIMO, layers;

a scaling factor; and a maximum supported modulation order;

the legacy restriction restricts a product of the maximum number of supported MIMO layers, the scaling factor, and the maximum supported modulation order to be greater than 4; and the first restriction restricts the product to be greater than 1.

2. The method of claim 1, further comprising:

determining the maximum data rate based on the indicated plurality of capability parameters.

3. The method of claim 1, wherein:

the maximum supported modulation order is one of a plurality of modulation orders including a lowest maximum supported modulation order and a second-lowest maximum supported modulation order; and the first restriction restricting the wireless device from one of:

indicating the lowest maximum supported modulation order; and indicating the lowest maximum supported modulation order and the second-lowest maximum supported modulation order.

4. The method of claim 1, wherein:

the scaling factor is one of a plurality of scaling factors including a lowest scaling factor, a second-lowest scaling factor, and a third-lowest scaling factor; and the first restriction restricting the wireless device from indicating at least one of:

the lowest scaling factor;

the second-lowest scaling factor value; and the third-lowest scaling factor.

5. The method of claim 1, wherein:

the scaling factor is one of a plurality of scaling factors including a lowest scaling factor, a second-lowest scaling factor, and a third-lowest scaling factor, and a fourth-lowest scaling factor;

the second indication omitting the scaling factor based on the first restriction restricting the wireless device from indicating the lowest scaling factor, the second-lowest scaling factor value, and the third-lowest scaling factor value; and the maximum data rate determination being based on the fourth-lowest scaling factor.

6. The method of claim 1, wherein:

the first indication indicates a plurality of data transmission types, each one of the plurality of data transmission types being associated with one of the legacy restriction and the first restriction;

the communicating with the wireless device being associated with a first data transmission type; and the maximum data rate determination being based on which one of the legacy restriction and the first restriction the first data transmission type is associated with.

7. The method of claim 1, wherein:

the first indication indicates at least one network parameter including at least one of:

a maximum number of multiple-input-multiple-output, MIMO, layers used in a cell;

a maximum number of hybrid automatic repeat request, HARQ, processes used for transmission in the cell; and a maximum modulation order used in a cell; and the plurality of capability parameters being further determined based on the at least one network parameter.

8. The method of claim 1, wherein the wireless device is a Reduced Capability, RedCap, wireless device.

9. A method implemented in a wireless device configured to communicate with a network node, the method comprising:

receiving a first indication from the network node indicating a first restriction, the first restriction being related to a maximum data rate computation for at least one carrier and being different from a legacy restriction;

causing transmission of a second indication to the network node indicating a plurality of capability parameters, the plurality of capability parameters violating the legacy restriction and being in accordance with the first restriction;

communicating with the network node on the at least one carrier in accordance with a maximum data rate associated with the indicated plurality of capability parameters;

the plurality of capability parameters includes at least one of:

a maximum number of supported multiple-input-multiple-output, MIMO, layers;

a scaling factor; and a maximum supported modulation order;

the legacy restriction restricts a product of the maximum number of supported MIMO layers, the scaling factor, and the maximum supported modulation order to be greater than 4; and the first restriction restricts the product to be greater than 1.

10. The method of claim 9, wherein method further comprises:

determining the plurality of capability parameters based on the first restriction.

11. The method of claim 9, wherein:

the maximum supported modulation order is one of a plurality of modulation orders including a lowest maximum supported modulation order and a second-lowest maximum supported modulation order; and the first restriction restricting the wireless device from one of:

indicating the lowest maximum supported modulation order; and indicating the lowest maximum supported modulation order and the second-lowest maximum supported modulation order.

12. The method of claim 9, wherein:

the scaling factor is one of a plurality of scaling factors including a lowest scaling factor, a second-lowest scaling factor, and a third-lowest scaling factor; and the first restriction restricting the wireless device from indicating at least one of:

the lowest scaling factor;

the second-lowest scaling factor value; and the third-lowest scaling factor.

13. The method of claim 9, wherein:

the scaling factor is one of a plurality of scaling factors including a lowest scaling factor, a second-lowest scaling factor, and a third-lowest scaling factor, and a fourth-lowest scaling factor;

the second indication omitting the scaling factor based on the first restriction restricting the wireless device from indicating the lowest scaling factor, the second-lowest scaling factor value, and the third-lowest scaling factor value; and the maximum data rate determination being based on the fourth-lowest scaling factor.

14. The method of claim 9, wherein:

the first indication indicates a plurality of data transmission types, each one of the plurality of data transmission types being associated with one of the legacy restriction and the first restriction;

the communicating with the network node being associated with a first data transmission type; and the maximum data rate determination being based on which one of the legacy restriction and the first restriction the first data transmission type is associated with.

15. The method of claim 9, wherein:

the first indication indicates at least one network parameter including at least one of:

a maximum number of multiple-input-multiple-output, MIMO, layers used in a cell;

a maximum number of hybrid automatic repeat request, HARQ, processes used for transmission in the cell; and a maximum modulation order used in a cell; and the plurality of capability parameters being further determined based on the at least one network parameter.

16. The method of claim 9, wherein the wireless device is a Reduced Capability, RedCap, wireless device.

17. A network node configured to communicate with a wireless device, the network node comprising:

processing circuitry configured to:

cause transmission of a first indication to the wireless device indicating a first restriction, the first restriction being related to a maximum data rate computation for at least one carrier and being different from a legacy restriction;

receive a second indication from the wireless device indicating a plurality of capability parameters, the plurality of capability parameters violating the legacy restriction and being in accordance with the first restriction;

communicate with the wireless device on the at least one carrier in accordance with a maximum data rate associated with the indicated plurality of capability parameters;

the plurality of capability parameters includes at least one of:

a maximum number of supported multiple-input-multiple-output, MIMO, layers;

a scaling factor; and a maximum supported modulation order;

the legacy restriction restricts a product of the maximum number of supported MIMO layers, the scaling factor, and the maximum supported modulation order to be greater than 4; and the first restriction restricts the product to be greater than 1.

18. The network node of claim 17, wherein the wireless device is a Reduced Capability, RedCap, wireless device.

19. A wireless device configured to communicate with a network node, the wireless device comprising:

processing circuitry configured to:

receive a first indication from the network node indicating a first restriction, the first restriction being related to a maximum data rate computation for at least one carrier and being different from a legacy restriction;

cause transmission of a second indication to the network node indicating a plurality of capability parameters, the plurality of capability parameters violating the legacy restriction and being in accordance with the first restriction;

communicate with the network node on the at least one carrier in accordance with a maximum data rate associated with the indicated plurality of capability parameters;

the plurality of capability parameters includes at least one of:

a maximum number of supported multiple-input-multiple-output, MIMO, layers;

a scaling factor; and a maximum supported modulation order;

the legacy restriction restricts a product of the maximum number of supported MIMO layers, the scaling factor, and the maximum supported modulation order to be greater than 4; and the first restriction restricts the product to be greater than 1.

20. The wireless device of claim 19, wherein the wireless device is a Reduced Capability, RedCap, wireless device.

* * * * *